United States Patent [19]

Kocache et al.

[11] 3,826,974

[45] July 30, 1974

[54] GAS TESTING APPARATUS OF THE MAGNETIC SUSCEPTIBILITY TYPE UTILIZING A GLASS COATED FILAMENT SUPPORT FUSED TO THE TEST BODY

[75] Inventors: Riad M. A. Kocache, Tunbridge Wells; Danny F. Holman, Crowborough, both of England

[73] Assignee: Sybron Corporation, Rochester, N.Y.

[22] Filed: Jan. 15, 1973

[21] Appl. No.: 323,952

[52] U.S. Cl.................................. 324/36, 73/27 A
[51] Int. Cl.......................................... G01r 33/12
[58] Field of Search..................... 324/36; 73/27 A

[56] References Cited
UNITED STATES PATENTS
2,416,344 2/1947 Pauling .................................. 324/36
2,744,234 6/1956 Munday et al. ....................... 324/36

FOREIGN PATENTS OR APPLICATIONS
753,315 7/1956 Great Britain ..................... 73/27 A

*Primary Examiner*—Robert J. Corcoran
*Attorney, Agent, or Firm*—Theodore B. Roessel; Joseph C. MacKenzie

[57] ABSTRACT

Glass is used in the construction of gas testing apparatus of the magnetic susceptibility type for both protectively coating and mechanically connecting together parts of the apparatus exposed to the gas under test.

6 Claims, 10 Drawing Figures

GAS TESTING APPARATUS OF THE MAGNETIC SUSCEPTIBILITY TYPE UTILIZING A GLASS COATED FILAMENT SUPPORT FUSED TO THE TEST BODY

FIELD OF THE INVENTION

This invention relates to apparatus for the testing of gases and more specifically to an apparatus for measuring the magnetic susceptibility of a gas. Such measurement is of use in determining the composition of the gas measured.

DESCRIPTION OF THE PRIOR ART

Apparatus for measuring the magnetic susceptibility of a gas is already known, see for example British Pat. specification Nos. 703,240 and 746,778. Specification No. 703,240 discloses apparatus whereby the magnetic susceptibility of a gas is measured using a body suspended on a fiber in a cell containing the gas to be tested and subjected to a non-uniform magnetic field whereby the body is rotated; the angular deviation is dependent on the suceptibility of the gas, and is observed by a light beam reflected by a mirror attached to the fiber. Specification No. 746,778 discloses apparatus similar to that in Specification No. 703,240 but with the body surrounded by a wire loop secured thereto which is short circuited to provide damping or energized with a measured current to provide a restoring torque bringing the body back to its original position.

In the apparatus described in Specification No. 746,778 the loops of wire surrounding the body are connected to it by an adhesive such as epoxy resin, silver chloride or shellac; the mirror is also cemented to the body. Furthermore, the suspension fiber is cemented at one end to a torsion head and to a spring, which is cemented to the back piece of the cell body, at the other end.

In using an apparatus of this kind, in many applications, the sample gas contains a number of active and corrosive gases such as chlorine, acetic acid vapor, ammonia, hydrogen chloride, sulphur dioxide or vapors of solvents. These may attack the cement at the different points, resulting in a weakening of the point of adhesion and a mechanical movement leading to a drift in the measurement.

SUMMARY OF THE INVENTION

The present invention provides apparatus for testing a gas comprising a body suspended on a fiber in a cell adapted to receive gas to be tested, means for subjecting said body to a magnetic field and means for measuring the angular movement of said body, the fiber being coated over a portion of the length of the fiber with a material capable of being fused with the material of the body, and the body being suspended on the fiber by fusion of the two materials.

It is an object of the present invention to provide apparatus in which the use of cements is obviated, resulting in apparatus with higher resistance to attack by active chemicals, and also permitting operation at higher temperatures.

Other objects and advantages of the invention will appear from the following description of exemplary embodiments thereof.

Figure 1:
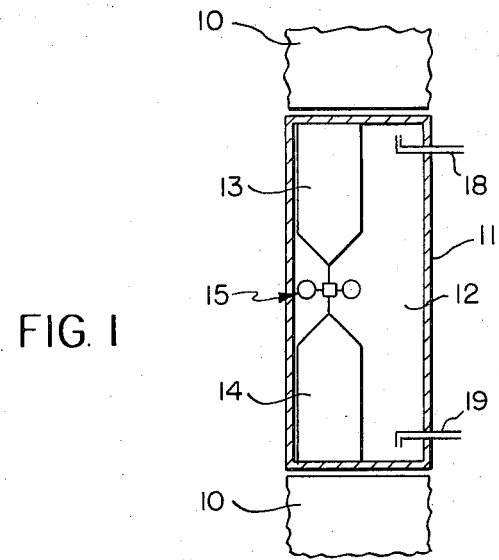
FIG. 1 is a diagrammatic side view of a test instrument.
Figure 2:
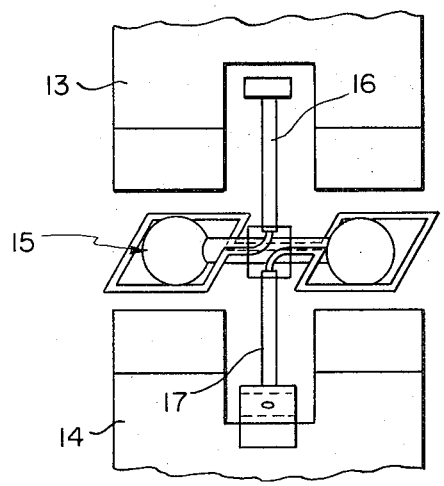
FIG. 2 is a diagrammatic front view of part of the instrument of FIG. 1.
Figure 3:
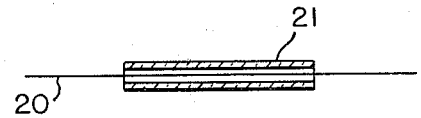
FIG. 3 is a diagram showing a portion of suspension fiber or ligament in position in a tube of vitreous material before sheathing.

The measurements are made by an apparatus of the type shown in FIGS. 1 and 2, which comprises a magnet 10 and a cell 11 providing a chamber 12 between the facing poles 13, 14 of the magnet, the cell being made from a substantiallynonmagnetic material. The two magnetic pole pieces are shaped to produce a non-uniform magnetic field. A test body 15 is suspended on fibers or ligaments 16, 17 supported at both ends within the chamber, and gas inlet 18 and outlet 19 are provided for the passage of gas through the chamber. Suitable means such as a mirror are used for detecting the deflecting force exerted on the testpiece by the gas.

Figure 4:
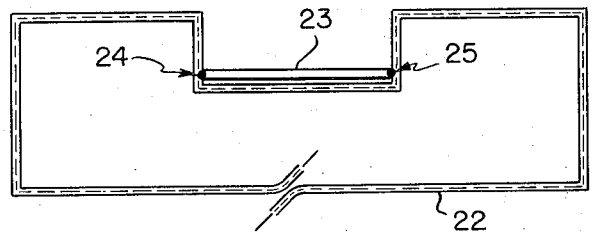
FIG. 4 is a diagram showing the manner of shaping a sheathed fiber.
Figures 5, 6:
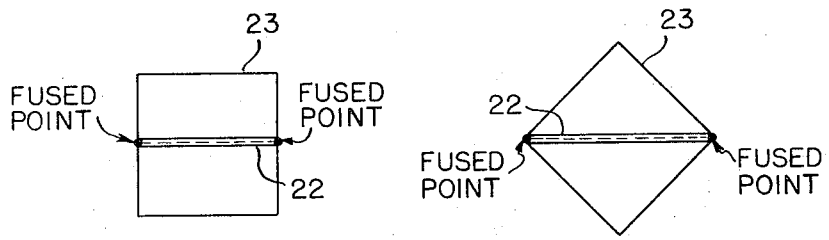
FIG. 5 is a diagram showing one method of attaching a mirror to the shaped, sheathed fiber.
FIG. 6 is a diagram showing another method of attaching a mirror to the shaped, sheathed fiber.

In one form of the invention, a support material is prepared by inserting a fiber 20 of suitable suspension material, in this case a metallic wire or fiber, in a drawn tube 21 of vitreous material, such as fused silica or borosilicate glass which will be substantially proof against chemical attack by substances such as the invention may be expected to encounter, with the ends of the fiber extending at both ends beyond the end of the tube 20. The tube is then heated, for example by a flame, until it is fused and caused to form a sheath on the fiber. The sheath of the wire is then shaped, while hot enough to be plastic, somewhat to the shape shown at 22 in FIG. 4, and the mirror 23 of the moving system is attached to the shaped sheathed fiber, at points 24 and 25, by fusing the glass of the sheathing to the glass of the mirror. The mirror, if square or rectangular can be attached at the ends of its diameter as in FIG. 5, or at the ends of its diagonal, as in FIG. 6.

Figure 7:
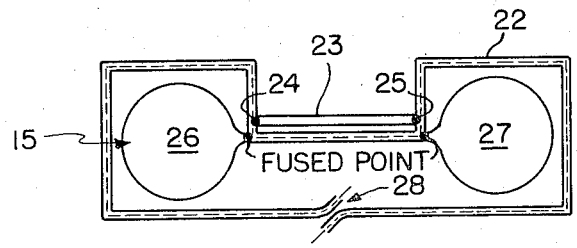
FIG. 7 is a diagram showing the method of attaching the spheres to the assembly of FIG. 5 or FIG. 6.
Figure 8:
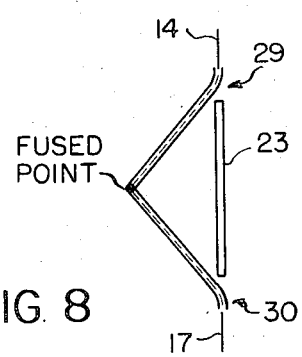
FIG. 8 is a diagram showing an alternative method of shaping the ends of the sheathed fiber.

The spheres 26, 27 which form part of the test body 15, and are made of vitreous material, are fused to the sheathing of the fiber adjacent points 24 and 25, as shown in FIG. 7. The end portions of the fiber are shaped to afford the desired suspension as at 28, FIG. 7, or as at 29 and 30, FIG. 8.

The ends of the sheath are suitably terminated so that the bare suspension fiber is exposed at the top and bottom ends of the test body above its centre of inertia, and the fiber is welded at one end to a torsion head pin and to a spring at the other. The spring is rigidly fixed to the back part of the cell body by solder glass. The ends of the bare suspension fiber are brought out to the outside as electrical contacts by welding them to suitably shaped pins (not shown).

Figure 9:
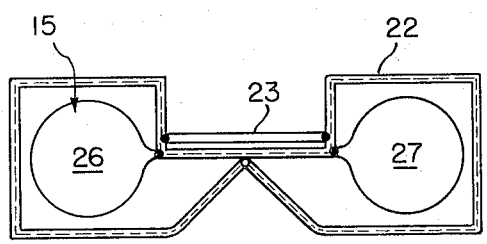
FIG. 9 is a diagram showing another method of shaping the ends of the sheated fiber.
Figure 10:
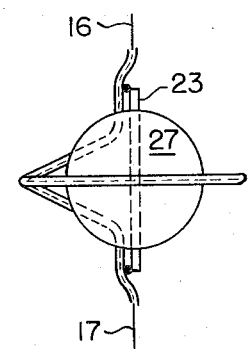
FIG. 10 is a diagrammatic side view of an assembly.

An alternative type of front suspension is shown in FIGS. 9 and 10.

By this means the only parts of the moving element of the cell exposed to the gas under test is the vitreous material and the material of the suspension fiber. This enables the moving element of the instrument to be made more resistant to the chemical action of such gas. Preferably, such cell body parts as will contact the gas under test, and are of such material as could be corroded by the gas under test, are also coated with vitreous material, and the fiber itself is made of a substantially corrosion proof material, whereby it results that instruments as a whole is substantially corrosion proof. Also, use of glass instead of cement makes the apparatus usable at much higher temperatures, for instance, over 100°C. Use at higher temperatures is sometimes necessary and/or desirable, as, for example, to prevent moisture from condensing on the movable parts of the cell, thereby degrading test results.

We claim:

1. Apparatus for testing a gas comprising a body suspended on a fiber in a cell adapted to receive the gas to be tested, pole pieces for subjecting said body to a magnetic field and a device for measuring the angular movement of said body, characterized in that said fiber has a coating of protective material which is both effectively integral with said fiber and fused with the material of said body, said body being suspended on said fiber by a fused connection consisting essentially of said two materials.

2. Apparatus according to claim 1, wherein the first said material is a vitreous material.

3. Apparatus according to claim 1, wherein said measuring device comprises a mirror fixed to said fiber by fused connection of said coating with the mirror.

4. Apparatus according to claim 1 wherein said fiber is an electrically conducting wire and its ends are adapted to be connected to a source of current.

5. Apparatus according to claim 2, wherein said fiber is an electrically conducting wire and its ends are adapted to be connected to a source of current.

6. Apparatus according to claim 3, wherein said fiber is an electrically conducting wire and its ends are adapted to be connected to a source of current.

* * * * *